United States Patent
Holan et al.

(10) Patent No.: US 10,204,374 B1
(45) Date of Patent: Feb. 12, 2019

(54) PARALLEL FRAUD CHECK

(71) Applicant: Amazon Technologies, Inc., Seattle, WA (US)

(72) Inventors: Eric Steven Holan, Mercer Island, WA (US); Hua Tang, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 663 days.

(21) Appl. No.: 14/739,759

(22) Filed: Jun. 15, 2015

(51) Int. Cl.
*G06Q 30/06* (2012.01)

(52) U.S. Cl.
CPC .............. *G06Q 30/0637* (2013.01)

(58) Field of Classification Search
USPC ........................................ 705/26.82
See application file for complete search history.

(56) References Cited

U.S. PATENT DOCUMENTS

| | | | | |
|---|---|---|---|---|
| 7,139,731 B1* | 11/2006 | Alvin | ............ | G06Q 10/087 705/35 |
| 8,073,785 B1* | 12/2011 | Candella | ............ | G06Q 20/342 705/75 |
| 8,290,838 B1* | 10/2012 | Thakur | ............ | G06Q 40/02 705/35 |
| 8,407,110 B1* | 3/2013 | Joseph | ............ | G06Q 10/087 705/26.1 |
| 9,348,896 B2* | 5/2016 | Faith | ............ | G06F 17/30696 |
| 2002/0099649 A1* | 7/2002 | Lee | ............ | G06Q 20/04 705/38 |
| 2003/0069820 A1* | 4/2003 | Hillmer | ............ | G06Q 20/206 705/35 |
| 2004/0049430 A1* | 3/2004 | Redenbaugh | ............ | G06Q 10/087 705/26.81 |
| 2005/0108102 A1* | 5/2005 | York | ............ | G06Q 30/06 705/26.41 |
| 2005/0108178 A1* | 5/2005 | York | ............ | G06Q 20/00 705/75 |
| 2005/0149455 A1* | 7/2005 | Bruesewitz | ............ | G06Q 20/04 705/64 |
| 2006/0190287 A1* | 8/2006 | Forshaw | ............ | G06Q 10/08 705/26.1 |
| 2007/0038568 A1* | 2/2007 | Greene | ............ | G06Q 20/40 705/50 |
| 2007/0179859 A1* | 8/2007 | Chan | ............ | G06Q 30/00 705/26.81 |

(Continued)

*Primary Examiner* — Ashford S Hayles
(74) *Attorney, Agent, or Firm* — Lee & Hayes, P.C.

(57) ABSTRACT

In some examples, a fulfillment service may receive a purchase order for delivery of one or more items. In response, the fulfillment service may determine an initial risk score representing a first probability that the purchase order is a potentially fraudulent transaction. In addition, the fulfillment service may request fulfillment of the purchase order based on the initial risk score being below a predetermined threshold. During fulfillment of the purchase order, the fulfillment service may monitor one or more attributes associated with the purchase order. Further, the fulfillment service may determine a revised risk score based on monitoring the one or more attributes. In some cases, the fulfillment service may cancel fulfillment of the purchase order based at least in part on the revised risk score.

20 Claims, 7 Drawing Sheets

(56) References Cited

U.S. PATENT DOCUMENTS

| | | | |
|---|---|---|---|
| 2007/0192215 A1* | 8/2007 | Taylor | G06Q 10/087 705/28 |
| 2007/0288375 A1* | 12/2007 | Talbert | G06Q 20/02 705/44 |
| 2008/0010678 A1* | 1/2008 | Burdette | G06Q 30/0603 726/15 |
| 2008/0162202 A1* | 7/2008 | Khanna | G06Q 20/10 705/14.47 |
| 2008/0275748 A1* | 11/2008 | John | G06Q 30/06 705/35 |
| 2009/0307028 A1* | 12/2009 | Eldon | G06Q 20/12 705/37 |
| 2010/0005013 A1* | 1/2010 | Uriarte | G06Q 20/04 705/30 |
| 2010/0042510 A1* | 2/2010 | Zeinfeld | G06Q 10/087 705/26.1 |
| 2010/0262521 A1* | 10/2010 | Robinson | G06Q 10/08 705/29 |
| 2011/0016031 A1* | 1/2011 | Engel | G06Q 20/04 705/35 |
| 2012/0030067 A1* | 2/2012 | Pothukuchi | G06Q 10/08 705/26.81 |
| 2012/0078767 A1* | 3/2012 | Clarke | G06Q 10/087 705/35 |
| 2012/0158541 A1* | 6/2012 | Ganti | G06Q 30/0185 705/26.35 |
| 2012/0158585 A1* | 6/2012 | Ganti | G06Q 20/40 705/44 |
| 2012/0197802 A1* | 8/2012 | Smith | G06Q 20/12 705/44 |
| 2013/0282562 A1* | 10/2013 | Gallo | G06Q 20/12 705/39 |
| 2013/0346142 A1* | 12/2013 | Young | G06Q 30/02 705/7.28 |
| 2014/0089197 A1* | 3/2014 | Talbert | G06Q 20/12 705/44 |
| 2014/0101050 A1* | 4/2014 | Clarke | G06Q 20/4016 705/44 |
| 2014/0188668 A1* | 7/2014 | Brabec | G06Q 30/0635 705/26.81 |
| 2015/0012430 A1* | 1/2015 | Chisholm | G06Q 20/4016 705/44 |
| 2015/0026027 A1* | 1/2015 | Priess | G06Q 40/00 705/35 |
| 2015/0134512 A1* | 5/2015 | Mueller | G06Q 20/4016 705/39 |
| 2015/0142500 A1* | 5/2015 | Aqlan | G06O 10/06315 705/7.25 |
| 2015/0170147 A1* | 6/2015 | Geckle | G06Q 20/4016 705/44 |
| 2015/0206146 A1* | 7/2015 | Siddens | G06Q 40/12 705/30 |
| 2016/0071190 A1* | 3/2016 | Voelz | G06O 30/0635 705/26.81 |
| 2016/0239771 A1* | 8/2016 | Gukal | G06Q 10/0635 |
| 2016/0300171 A1* | 10/2016 | Boldrin | G06Q 10/06315 |
| 2016/0300232 A1* | 10/2016 | Tsukada | G06Q 30/06 |
| 2016/0328781 A1* | 11/2016 | Patel-Zellinger | G06Q 30/0635 |

\* cited by examiner

500

```
RECEIVE, FROM A FIRST CUSTOMER DEVICE, A FIRST PURCHASE ORDER FOR AN
ITEM, WHEREIN THE FIRST PURCHASE ORDER INCLUDES A CUSTOMER
IDENTIFIER THAT IDENTIFIES A CUSTOMER PURCHASING THE ITEM, AN ITEM
IDENTIFIER THAT IDENTIFIES THE ITEM, A CUSTOMER ADDRESS IDENTIFIER THAT
IDENTIFIES A DELIVERY DESTINATION OF THE ITEM, A DEVICE IDENTIFIER THAT
IDENTIFIES THE FIRST CUSTOMER DEVICE, AND PAYMENT INFORMATION
502
```

↓

```
DETERMINE AN INITIAL RISK SCORE REPRESENTING A FIRST PROBABILITY THAT
THE FIRST PURCHASE ORDER IS A POTENTIALLY FRAUDULENT TRANSACTION
BASED AT LEAST IN PART ON CUSTOMER ACCOUNT INFORMATION, ITEM
INFORMATION, THE DELIVERY DESTINATION, AND THE PAYMENT INFORMATION
504
```

↓

```
SEND THE FIRST PURCHASE ORDER TO A FULFILLMENT FACILITY REQUESTING
PREPARATION OF THE ITEM FOR DELIVERY BASED AT LEAST IN PART ON THE
INITIAL RISK SCORE BEING BELOW A PREDETERMINED THRESHOLD
506
```

↓

```
SEND A DELIVERY REQUEST TO A DELIVERY SERVICE REQUESTING DELIVERY OF
THE ITEM TO THE CUSTOMER ADDRESS BASED AT LEAST IN PART ON THE INITIAL
RISK SCORE BEING BELOW THE PREDETERMINED THRESHOLD, WHEREIN THE
DELIVERY REQUEST INCLUDES THE ITEM IDENTIFIER AND THE CUSTOMER
ADDRESS IDENTIFIER
508
```

↓

```
RECEIVE A SECOND PURCHASE ORDER AFTER SENDING THE FIRST PURCHASE
ORDER TO THE FULFILLMENT FACILITY OR AFTER SENDING THE DELIVERY
REQUEST TO THE DELIVERY SERVICE
510
```

FROM FIG. 5A

```
ASSOCIATE THE SECOND PURCHASE ORDER WITH THE FIRST PURCHASE ORDER
IN RESPONSE TO DETERMINING THAT THE SECOND PURCHASE ORDER AND THE
FIRST PURCHASE ORDER SHARE AT LEAST ONE OF THE ITEM IDENTIFIER, THE
CUSTOMER IDENTIFIER, THE DEVICE IDENTIFIER, OR THE CUSTOMER ADDRESS
IDENTIFIER
512
```

```
DETERMINE A REVISED RISK SCORE FOR THE FIRST PURCHASE ORDER BASED
AT LEAST IN PART ON THE SECOND PURCHASE ORDER, THE REVISED RISK
SCORE BEING ABOVE THE PREDETERMINED THRESHOLD
514
```

```
SEND A CANCELATION REQUEST TO THE DELIVERY SERVICE TO CANCEL
DELIVERY OF THE ITEM BASED AT LEAST IN PART ON THE REVISED RISK SCORE
BEING ABOVE THE PREDETERMINED THRESHOLD
516
```

PARALLEL FRAUD CHECK

BACKGROUND

Many electronic commerce merchants employ fraud detection systems as part of a sequential fulfillment process. During the fraud detection step, many fraud detection systems may be unable to accurately detect potentially fraudulent transactions due to limited information. As a result, electronic commerce merchants must often choose between fulfilling a fraudulent purchase order and delaying fulfillment of a purchase order until the purchase order can be sufficiently reviewed.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIGS. 5A and 5B illustrate a flow diagram of another example process for parallel fraud processing, according to some implementations.

DETAILED DESCRIPTION

Figure 1:
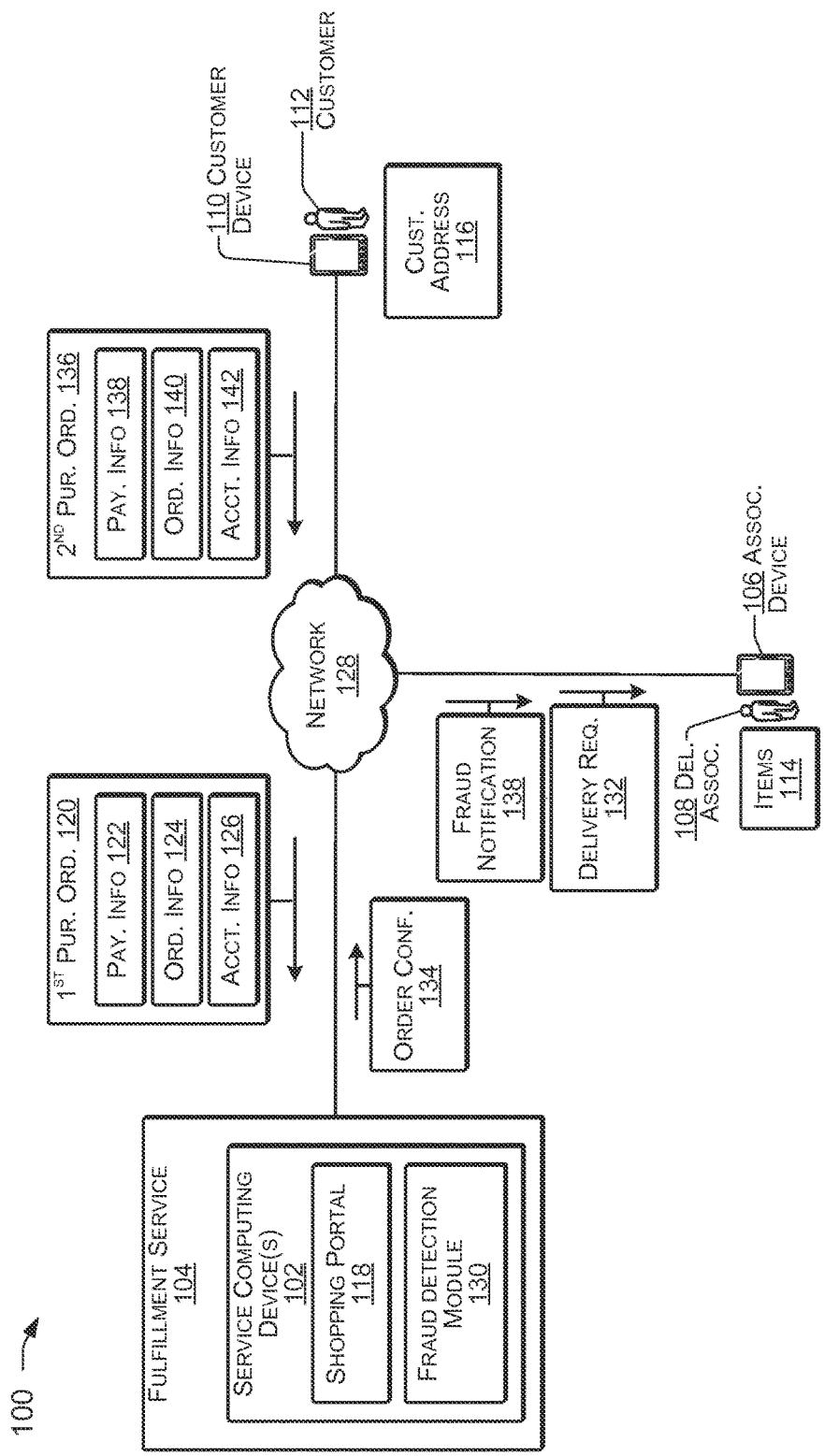
FIG. 1 illustrates an example environment for a fulfillment service that performs parallel fraud processing, according to some implementations.

Some implementations described herein include techniques and arrangements for performing parallel fraud processing during a fulfillment process executed by a retail fulfillment service. For example, a fulfillment service may receive a first purchase order from a customer device associated with a customer. Further, the fulfillment service may determine a first risk score representing a probability that the first purchase order is a potentially fraudulent transaction (e.g., a transaction using a stolen credit card, etc.). If the first risk score is below a predetermined fraud threshold, the fulfillment service may continue with fulfillment of the purchase order while monitoring the customer device, a payment instrument associated with the purchase order, a delivery address for the items of the purchase order, and/or other information associated with the first purchase order. Therefore, the fulfillment service may increase a time window for accurately determining whether the first purchase order is a potentially fraudulent transaction while meeting requirements under service level agreements and/or delivery guarantees. Furthermore, the fulfillment service may determine a second risk score associated with a second, subsequent, purchase order based at least in part on the monitoring associated with the first purchase order. If the second risk score is above a predetermined fraud threshold, and the second purchase order is determined to be associated with the first purchase order, then the fulfillment service may cancel the transactions and/or fulfillment processes for the first and second purchase orders. For example, the fulfillment service may instruct a fulfillment facility or a delivery service to stop the delivery of items associated with the first and second purchase orders.

In some examples, a fulfillment service may use a fraud detection module that includes a decision model to determine a risk score representing a probability that the purchase order is a potentially fraudulent transaction. Further, the fraud detection module may determine whether the fulfillment service will fulfill the purchase order based at least in part on the risk score. For example, if the risk score is below a predetermined threshold, the fraud detection module may continue with a process to fulfill the purchase order.

In some embodiments, a risk score may be based at least in part on information associated with one or more customer devices, customer device activity (e.g., clickstream activity, browsing activity, transaction activity, etc.), attributes of the customer device, payment information, information associated with one or more purchase orders, and/or information associated with one or more customer accounts. Further, the risk score may be based at least in part on information associated with transactions previously identified as fraudulent.

In some embodiments, the decision model may include a rule based decision system. For instance, the decision model may include a decision tree (e.g., random forest model). Further, the decision factors of the decision model may correspond to information associated with one or more customer devices, customer device activity, attributes of the customer device, payment information, information associated with one or more purchase orders, and/or information associated with one or more customer accounts. In some other embodiments, the decision model may include cluster analysis models that identify clusters of transactions as potentially fraudulent based on grouping the transactions in light of shared commonalities.

In addition, the fraud detection module may periodically update and re-train the decision model based on new training data to keep the model up to date. For instance, the decision model may employ machine learning techniques to continuously train the decision model as training data is collected. Further, the fraud detection module may modify or alter weights assigned to individual factors of the decision model.

In some embodiments, the fraud detection module may determine that a second risk score exceeds the fraud threshold based at least in part on modifications to the purchase order. For instance, the fraud detection module may determine that a second risk score exceeds the fraud threshold based at least in part on a modification to a delivery address of the purchase order. In some cases, a delivery service may notify the fraud detection module of the modification to the delivery address.

In some embodiments, the fraud detection module may determine that a first purchase order is associated with a second purchase order due to a common payment type, delivery address, and/or other attributes of the purchase orders being similar or the same. For example, the fraud detection module may determine that the first purchase order is associated with the second purchase order due to common credit card information. In another example, the fraud detection module may determine that the first purchase order is associated with the second purchase order due to common account information (e.g., customer account identifier, email address, etc.). In yet another example, the fraud detection module may determine that the first purchase order is associated with the second purchase order due to shared attributes of a first device used to send the first purchase order and a second device used to send the second purchase order.

In some instances, the fraud detection module may determine whether the fulfillment service will fulfill a purchase order based at least in part on a level of certainty associated with a first risk score. For instance, if the fraud detection module determines that the level of certainty associated with the first risk score is at or below a threshold level of certainty, the fulfillment service may proceed with fulfillment of the first purchase order. In some cases, the level of certainty may correspond to the quantity and/or quality of decision factors used by the decision model to determine a risk score. Further, the level of certainty may include an uncertainty value. In some other cases, the level of certainty may correspond to a predetermined interval. For instance, the fraud detection module may determine that a risk score is uncertain based at least in part on the risk score falling in a predetermined uncertainty range (e.g., a risk score is uncertain if it falls in between 25% and 75%).

In some cases, the fraud detection module may assign a first purchase order to a queue for further review. For instance, the fraud detection module may determine a first risk score associated with the purchase order. Further, the fraud detection module may assign the purchase order to a queue for review by a human agent based at least in part on a level of certainty corresponding to the first risk score. In addition, the fraud detection module may determine a second risk score associated with the purchase order. Further, the fraud detection module may remove the purchase order from the queue based at least in part on a level of certainty associated with the second risk score. Alternatively, the fraud detection module may display information related to the first risk score and/or the second risk score during a review process of the first purchase order and/or the second purchase order. In some examples, the queue may be prioritized according to at least one of an expected date of delivery or a level of delivery service associated with the purchase order.

For discussion purposes, some examples are described in the environment of delivery assistance and risk mitigation. However, the implementations herein are not limited to the particular examples provided, and may be extended to other types of environments, other types of electronic devices, and so forth, as will be apparent to those of skill in the art in light of the disclosure herein.

FIG. 1 illustrates an example framework 100 for a fulfillment service that performs a parallel fraud detection process, according to some implementations. FIG. 1 shows illustrative interactions between service computing devices 102 of a fulfillment service 104, a delivery associate device 106 associated with a delivery associate 108, and a customer device 110 associated with a customer 112, when performing various operations, including managing delivery of one or more items 114 to the customer 112 at a customer address 116.

Referring to FIG. 1, suppose that the customer 112 endeavors to purchase (or alternatively, rent, lease or otherwise consume) the items 114 from an online shopping portal 118 (e.g., websites, peer-to-peer systems, etc.) of the fulfillment service 104. The customer 112 may visit the online shopping portal 118 using the customer device 110, and submit a first purchase order 120 for the items 114. As shown in FIG. 1, the first purchase order 120 may include payment information 122 (e.g., billing address, credit card account, bank account, rewards account, etc.), order information 124 (e.g., shipping address, order items, order quantity, delivery preferences, etc), and/or account information 126 (e.g., customer account identifier, customer account password, customer email addresses, etc). Some examples of the customer device 110 may include smart phones and mobile devices; desktop, terminal and workstation computing devices; laptop and netbook computing devices; tablet computing devices; automotive electronic devices; and any other device capable of communicating with the service computing devices 102.

As illustrated in FIG. 1, the first purchase order 120 is transmitted over a network 128 to the service computing devices 102. In some cases, the network 128 may be a publicly accessible network of linked networks, possibly operated by various distinct parties, such as the Internet. In other embodiments, the network 128 may include a private network, personal area network ("PAN"), LAN, WAN, cable network, satellite network, etc. or some combination thereof, each with access to and/or from the Internet. For example, the service computing devices 102 may be located within a single data center and may communicate via a private network.

As illustrated in FIG. 1, the service computing devices 102 may further include a fraud detection module 130. The fraud detection module 130 may detect potentially fraudulent transactions at the online shopping portal 118. In some instances, the fraud detection module 130 may employ well-known machine learning techniques to detect potentially fraudulent transactions. For example, the fraud detection module 130 may determine a risk score that represents the probability that the purchase order 120 is a fraudulent transaction based at least in part on information associated with the customer device 110 (e.g., Internet Protocol address ("IP address"), media access control address ("MAC address"), operating system, web browser, web plug-ins, installed applications, a device fingerprint, etc.), customer device activity (e.g., clickstream activity, browsing activity, transaction activity, etc.) at the shopping portal 118, the payment information 122, the order information 124, and/or the account information 126. In some instances, the fraud detection module 130 may determine that the purchase order 120 should not be fulfilled when the probability that the transaction is fraudulent is above a predetermined threshold. In some other instances, the fraud detection module 130 may determine that the purchase order 130 should be fulfilled when the probability that the transaction is fraudulent is below a predetermined threshold. In yet some other instances, the fraud detection module 130 may determine that the purchase order 120 should be fulfilled based at least in part on a level of certainty associated with the probability. For example, the fraud detection module 130 may determine that the purchase order 120 should be fulfilled when the fraud detection module 130 is uncertain about the probability that the transaction is fraudulent.

Referring to FIG. 1, if a first risk score representing the probability that the first purchase order 120 is fraudulent is below a predetermined threshold, the fulfillment service 104 may proceed with fulfillment of the first purchase order 120. For instance, the service computing devices 102 may send a delivery request 132 to the delivery associate device 106. In some instances, the delivery request 132 may instruct the delivery associate 108 to retrieve the items 114, and deliver the items 114 to the customer address 116. Further, the delivery request may include an identifier of the items 114 and an identifier of the customer address 116. Some examples of the delivery associate device 106 may include smart phones and mobile devices; desktop, terminal and workstation computing devices; laptop and netbook computing devices; tablet computing devices; automotive electronic devices; and any other device capable of communicating with the service computing devices 102. Further, the service computing devices 102 may send one or more order confirmations 134 to the customer device 110. The order confirmations 134 may provide information associated with fulfillment processing of the first purchase order 120. In some cases, the order confirmations 134 may include delivery information, such as an expected shipping date, an expected date of delivery, a delivery service tracking number, and so forth.

While the fulfillment service 104 and delivery associate 108 execute the fulfillment process, the fraud detection module 130 may monitor activity of the customer device 110 to perform a subsequent determination of a probability that the first purchase order 120 is a fraudulent transaction. Referring to FIG. 1, the customer 112 may re-visit the online shopping portal 118 using the customer device 110, and submit a second purchase order 136 to the online shopping portal 118. The second purchase order 136 may include payment information 138, order information 140, and/or account information 142. In addition, the fraud detection module 130 may determine a second risk score representing a probability that the first purchase order 120 is a potentially fraudulent transaction based at least in part on information associated with the second purchase order 136, in addition to information used to compute the first risk score. In some cases, the fraud detection module 130 may determine the second risk score in response to receipt of the information corresponding to the second purchase order 136. Additionally, or alternatively, the fraud detection module 130 may determine the second risk score in response to a passage of time.

For instance, the fraud detection module 130 may determine that the first purchase order 120 is a potentially fraudulent transaction based at least in part on the cost of the first purchase order 120 and/or the second purchase order 136. For example, a combined cost of the first purchase order 120 and the second purchase order 136 may be substantially larger than previous purchase orders associated with the customer 112. In another example, a combined cost of the first purchase order 120 and the second purchase order 136 may be substantially similar to transactions previously identified as fraudulent.

In some other instances, the fraud detection module 130 may determine that the first purchase order 120 is a potentially fraudulent transaction based at least in part on a quantity and/or a type of the items 114 of the first purchase order 120, and a quantity and/or a type of an item of the second purchase order 136. For example, a combined quantity of items ordered in the first purchase order 120 and the second purchase order 136 may indicate that the first purchase order 120 is a potentially fraudulent transaction. In some cases, the fraud detection model 130 may determine an expected order quantity for an item based at least in part on previous transactions. Further, the fraud detection model 130 may determine that the first purchase order 120 is potentially fraudulent based at least in part on the combined quantity of items ordered in the first purchase order 120 and the second purchase order 136 exceeding the expected order quantity for the item by a predetermined threshold.

In yet some other instances, the payment information 138 included in the second purchase order may indicate that the first purchase order 120 is a potentially fraudulent transaction. For example, the payment information 138 may be associated with other potentially fraudulent activity at the fulfillment service 104.

If the fraud detection module 130 determines that the first purchase order 120 is a potentially fraudulent transaction, the service computing devices 102 may send a fraud notification 138 to the delivery associate device 106 instructing the delivery associate 108 to cancel delivery of the items. For example, if a second risk score representing the probability that the first purchase order 120 is fraudulent is above a predetermined threshold, the service computing device 102 may send the fraud notification 138 to the delivery associate device 106 instructing the delivery associate 108 to cancel delivery of the items 114.

Additionally, or alternatively, if a level of certainty associated with the first risk score is below a predetermined threshold, the fulfillment service 104 may proceed with fulfillment of the first purchase order 120. For instance, the service computing devices 102 may send the delivery request 132 to the delivery associate device 106. In addition, the service computing devices 102 may send the order confirmations 134 to the customer device 110. Further, the fulfillment service 104 may flag the first purchase order 120 for further review by the fraud detection module 130 or a human agent.

In some cases, the fraud detection module 130 may perform the review based at least in part on the second purchase order 136 as described above. In some other cases, the fraud detection module 130 may provide a human agent with information related to the first purchase order 120 and the second purchase order 136. For example, the fraud detection module 130 may present the first risk score associated with the first purchase order 120 and the second risk score associated with the second purchase order 136 to the human agent via a graphical user interface.

Example implementations of the operation of the framework architecture 100 are explained in greater detail with reference to FIGS. 2 and 3, as follows.

Figure 2:
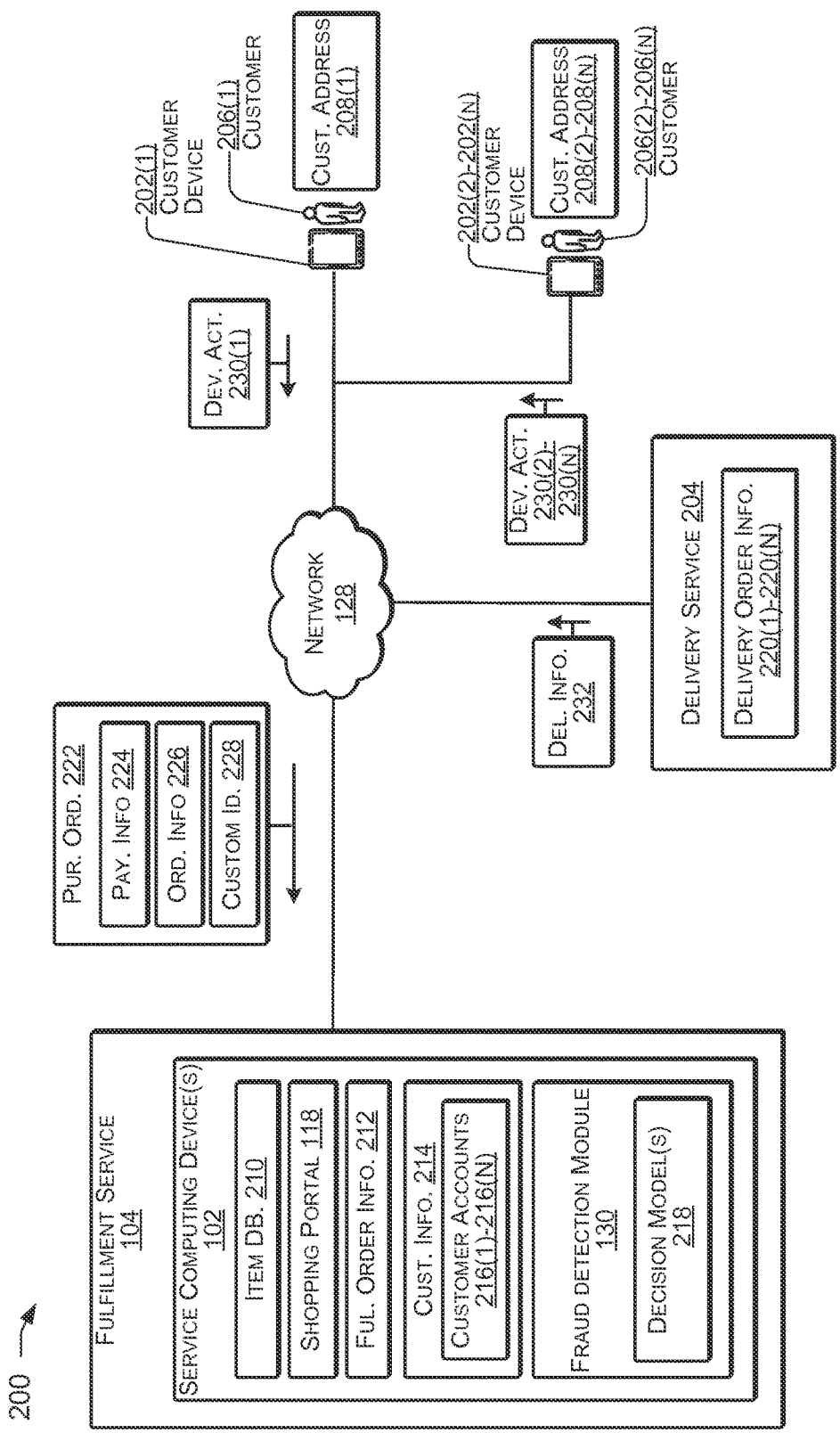
FIG. 2 illustrates another example environment for a fulfillment service that performs parallel fraud processing, according to some implementations.

FIG. 2 illustrates an example environment 200 for performing a parallel fraud detection process by a fulfillment service according to some implementations. FIG. 2 shows illustrative interactions between the service computing devices 102, the fulfillment service 104, customer devices 202, and a delivery service 204, when performing various operations, including monitoring the customer devices 202.

In the illustrated example, the customer devices 202 and the delivery service 204 are able to communicate with the service computing devices over the networks 128. Each customer device 202 may be associated with a customer 206. For example, a first customer device 202(1) may be associated with a first customer 206(1). Further, other customer devices 202(2)-202(N) may be associated with other customers 206(2)-206(N). In addition, each customer 206 may be associated with one or more customer addresses 208. For example, the first customer 206(1) may be associated with a first customer address 208(1). Further, other customers 206(2)-206(N) may be associated with other customer addresses 208(2)-208(N).

As illustrated in FIG. 2, the service computing devices 102 may include the online shopping portal 118, an item database 210, fulfillment order information 212, customer information 214, and the fraud detection module 130. The item database 210 may store item information for a plurality of items available for purchase, rental, lease or other consumption at the online shopping portal 118, with each item associated with one or more item identifiers. Further, the online shopping portal 118 may display the items of the item database 210 for consumption via a website or an application. In addition, one or more online merchants may offer the items identified in the item database 210 for consumption by the customers 202 via the online shopping portal 118.

For individual items, the item database 210 may store a cost of the item, a sales price of the item, inventory information (e.g., inventory quantity on hand, inventory locations, etc.), a manufacturer of the item, an item description, packaging information, applicable geographic restrictions, transaction history, customer comments, customer ratings, and so forth. In some cases, the transaction history may include information specifying previously identified fraudulent transactions related to an item. For instance, the transaction history may specify the date of a fraudulent purchase order, a time of the fraudulent purchase order, attributes of a customer device 202 associated with the fraudulent purchase order, and/or attributes of a customer 206 associated with the fraudulent purchase order.

The fulfillment order information 212 may include information associated with fulfillment activity within the fulfillment service 104. For example, the fulfillment order information 212 may include information (e.g., payment information, order information, account information, etc.) associated with purchase orders submitted by the customers 206 to the online shopping portal 118. Further, the fulfillment order information 212 may include information identifying past fulfillment activity associated with fraudulent transactions at the online shopping portal 118.

The customer information 214 may store information associated with one or more customer service accounts 216 established at the fulfillment service 104 for the customers 206. For instance, the customer information 214 may include customer account identifiers, login information (e.g., usernames, passwords, login history, etc.) to the fulfillment service 104, full names, email addresses, shipping addresses, related customer devices, billing addresses, credit card accounts, bank accounts, rewards accounts, and transaction history. Further, the service computing devices 102 may provide an interface for the entry and/or collection of the customer information 214. Each customer account 216 may be associated with a customer 206. For example, a first customer account 216(1) may be associated with a first customer 206(1). Further, other customer accounts 216(2)-216(N) may be associated with other customers 206(2)-206(N). The customer accounts 216 described herein may be created and maintained using any suitable types of data structures, and using any suitable data storage or database techniques. Further, the customer information 214 may include information identifying a relationship between customer accounts 216. For instance, a plurality of customer accounts 216 may share payment information (e.g., banking information, credit card accounts, rewards accounts, etc.), and/or one or more customer addresses 208. Further, in some cases a plurality of customer accounts 216 may be associated with a common customer device 202.

As illustrated in FIG. 2, the fraud detection module 130 may include one or more decision models 218. Further, the fraud detection module 130 may detect potentially fraudulent transactions at the online shopping portal 118 based at least in part on the decision model 218. For instance, the decision model 218 may include a prediction model that determines a risk score associated with a transaction at the online shopping portal 118. Further, the fraud detection module 130 may determine whether to perform fulfillment activity associated with the transaction based at least in part on the risk score. For example, if the risk score is below a predetermined threshold, the fraud detection module 130 may fulfill a purchase order associated with the transaction. Further, computing the risk score may be based on information from at least one of the item database 210, fulfillment order information 212, and/or customer information 214.

In some examples, the decision model 218 may employ well-known machine learning techniques to detect potentially fraudulent transactions. For instance, the decision model 218 may include a rule based decision system that determines the probability that a transaction is potentially fraudulent. Further, the decision model 218 may account for decision factors regarding at least customer addresses 208 associated with a transaction (e.g., shipping address, billing address, etc), customer accounts 216 associated with a transaction, item database 210 information associated with a transaction (item cost, previously identified fraudulent transactions, etc.), the fulfillment order information associated with a transaction (quantity of an order), customer devices associated with a transaction, clickstream data corresponding to the online shopping portal 118, time of day of the delivery attempt, day of the week, etc. Further, the decision model 218 may be periodically updated and re-trained based on new training data to keep the decision model 218 up to date.

Additionally, or alternatively, the decision model 218 may include trained statistical models. Further, the fraud detection module 130 may train the statistical models using the information from the item database 210, the fulfillment order information 212, and/or the customer information 214 as training data. The statistical models may be initially trained using the training data, checked for accuracy, and then used for detect potentially fraudulent transactions and/or adjust the rule based decision system. Further, the statistical models may be periodically updated and re-trained based on new training data to keep the model up to date. Further, the decision models 218 may include cluster analysis models that identify clusters of transactions as potentially fraudulent based on grouping the transactions in light of shared commonalities.

Examples of suitable models that may be incorporated into the decision model 218 herein may include decisions tree models, such as random forest models, regression models, such as linear regression models, and stochastic models, such as Markov models, hidden Markov models, and so forth. Furthermore, examples of machine learning platforms suited for use in various embodiments of the present invention include Elastic Machine Learning, Vowpal Wabbit, and Apache Mahout™.

Further, the fraud detection module 130 may determine a level of certainty associated with an output of the decision model 218. For instance, the fraud detection module 130 may determine a level of certainty associated with a risk score computed by the decision model 218. In some cases, the level of certainty may be based at least in part on a capability of information associated with the fraud detection module to determine that the first purchase order is a potentially fraudulent transaction. For example, the level of certainty may correspond to a quantity and/or quality of decision factors used by the decision model 218. Further, a quality of a decision factor may be based on a weight corresponding to the decision factor. For instance, a decision factor associated with a heavier weight within the decision model may be considered to have a higher quality than a decision factor associated with a lower weight within the decision model. In some instances, the level of certainty may correspond to the capability of the decision model 218 to determine an accurate risk score based on information available from the item database 210, the fulfillment order information 212, and/or the customer information 214. Alternatively, the level of certainty may correspond to a value of a risk score. For instance, the fraud detection module 130 may determine that the risk score is uncertain based at least in part on the risk score falling in a predetermined uncertainty range.

In addition, the fraud detection module 130 may further determine whether to fulfill a purchase order based at least in part on the level of certainty. For example, if the fraud detection module 130 determines that the risk score is uncertain, the fraud detection module 130 may determine to proceed with fulfillment of a purchase order. Further, the fraud detection module 130 may collect additional information associated with the purchase order as described herein.

The delivery service 204 may manage and/or perform delivery of items to the customers 206. For example, the delivery service 204 may employ delivery associates, such as delivery associate 108 (not shown in FIG. 2), to deliver items, such as the items 114 (also not shown in FIG. 2), to the customers 206. In some cases, the delivery service 204 may be a division or department of the fulfillment service 104. In some other cases, the delivery service 204 may be an independent contractor or service provider to the fulfillment service 104. Further, delivery associates, such as delivery associate 108 (also not shown in FIG. 2), may include employees, devices, agents, or contractors of the delivery service 204.

As illustrated in FIG. 2, the delivery service 204 may include delivery order information 220. The delivery order information 220 may include information associated with delivery requests, such as delivery request 132 (not shown in FIG. 2). For instance, the delivery order information 220 may include information specifying one or more customer addresses 208 and/or a level of delivery service (e.g., next-day shipping, two-day shipping, priority shipping, ground shipping, etc.) associated with a delivery request 132. Further, the delivery order information 220 may identify customer addresses 208 associated with fraudulent transactions.

Referring to FIG. 2, suppose that the customer 206(1) endeavors to purchase an item (e.g., twenty cases of bottled spring water) from the online shopping portal 118. The customer 206(1) may visit the online shopping portal 118 using the customer device 208(1), and submit a purchase order 222 for the bottled spring water. As shown in FIG. 2, the purchase order 222 may include payment information 224 (e.g., a credit card account associated with the customer 206(1)), order information 226 (e.g., an identifier of the bottle spring water and information specifying a quantity of twenty cases), and/or a customer account information 228 (e.g., a username associated with the customer 206(1)). As illustrated in FIG. 2, the purchase order 222 is transmitted over a network 128 to the service computing devices 102.

Upon receipt of the purchase order 222, the service computing device 102 may determine whether to fulfill the purchase order 222 for twenty cases of bottled spring water based at least in part on the fraud detection module 130. For instance, the fraud detection module 130 may determine to fulfill the purchase order based in part on at least one of the decision model 218 predicting that the purchase order is not a potentially fraudulent transaction and/or the fraud detection module 130 determining that a level of certainty associated with the output of the decision model 218 is below a predetermined threshold.

While the fulfillment service fulfills the purchase order 222, the fraud detection module 130 may continue to monitor whether the purchase order 222 is a potentially fraudulent transaction. As shown in FIG. 2, the fraud detection module 130 may receive device activity 230 from the customer devices 206. The device activity 230 may include information related to the activity of the customers 206 via the customer devices 202. In some examples, the device activity 230 may correspond to activity of the customers 206 at the shopping portal 118. In some other examples, the device activity 230 may correspond to activity of the customers at another website or application related to the fulfillment service 104. Each device activity 230 may be associated with a customer device 202. For example, a first device activity 230(1) may correspond to the customer device 202(1), an Nth device activity 230(N) may correspond to an Nth customer device 202(N), and so forth. Further, the service computer device 102 may associate device activity 230 with customer information 214 maintained by the service computing device 102. For example, the first device activity 230(1) may be associated with a first customer account 216(1) corresponding to the first customer 206(1), the Nth device activity 230(N) may be associated with an Nth customer profile 216(N) corresponding to an Nth customer 206(N), and so forth.

In some examples, the device activity 230 may include subsequent purchase orders. For instance, the device activity 230(1) may include a second purchase order by the customer 206(1). In another instance, the device activity may include a second purchase order by a customer account 216(2) associated with customer account 216(1). In some examples, the device activity 230 may include login and browsing information associated with the shopping portal 118. For instance, the device activity 230 may include web-browsing history of the customer 206(1) at the shopping portal 118. In some other instances, the device activity 230(1) may include information corresponding to the date and time of logins to the shopping portal 118 by the customer 206(1). In some examples, the device activity 230(1) may include modifications to the purchase order 222. For instance, the device activity 230(1) may include modifications to a shipping address associated with the purchase order 222. In some other examples, the device activity 230(1) may include modifications to the customer account 216(1) of the customer 206(1). For instance, the device activity 230(1) may include a modification to an email address registered to the customer account 206(1) and/or resetting a password associated with the customer account 206(1). In some other examples, the device activity 230 may include information about one of the customer devices 202. For instance, the device activity 230 may include information identifying the customer device 202(1), a current location of the customer device 202(1), and/or one or more current settings (e.g., Internet Protocol address ("IP address"), media access control address ("MAC address"), operating system, web browser, web plug-ins, installed applications, a device fingerprint, etc.) of the customer device 202(1). In some examples, the location of the customer device 202(1) may be determined using a GPS sensor of the customer device 202(1) and/or geo-tagging an IP address associated with the customer device 202(1).

Further, the fraud detection module 130 may receive delivery information 232 from the delivery service 204. The delivery information 232 may include information corresponding to the purchase order 222. For instance, the delivery information 232 may include information indicating the occurrence of fraudulent activity at the customer address 208(1) associated with the purchase order 222. In another instance, the delivery information 232 may communicate that the customer 206(1) has modified the customer address 208(1) associated with the purchase order 222. Further, the delivery information 232 may include the new customer address 208(1) provided by the customer 206(1). In yet another instance, the delivery information 232 may include information identifying that the customer 206(1) has modified (e.g., upgraded or downgraded) the level of delivery service. For example, the delivery information 232 may indicate that customer 206(1) has requested that delivery of the bottled spring water be upgraded to a priority level of service from a lower level of service.

Upon receipt of the device activity 230 and/or the delivery information 232, the fraud detection module 130 may determine a second risk score representing the probability that the purchase order 222 is a potentially fraudulent transaction. In some examples, the second risk score may be based at least in part on updating the computations performed to determine the first risk score to include the device activity 230 and/or the delivery information 232. Further, the fraud detection module 130 may continuously determine risk scores (e.g., a third risk score, a fourth risk score, etc.) associated with the first purchase order based at least in part on the receipt of new information (e.g., device activity 230 and/or the delivery information 232) and/or a passage of time.

If the second risk score is above a pre-determined fraud threshold, the fraud detection module 130 may determine that the purchase order 222 is a potentially fraudulent transaction. In some instances, the fraud threshold applied to a first risk score and a second risk score may be different. Additionally, or alternatively, the fraud detection module 130 may determine that the purchase order 222 is a potentially fraudulent transaction based at least in part on the first risk score and the second risk score. For instance, if the first risk score is within a predetermined distance of a first predetermined fraud threshold and the second risk score is within a predetermined distance of a second predetermined fraud threshold, the fraud detection module 130 may determine that the purchase order 222 is a potentially fraudulent transaction.

In some cases, when the fraud detection module 130 determines that a level of certainty corresponding to a risk score is insufficient, the fraud detection module 130 may assign the purchase order 222 to a review queue. Further, the review queue may be prioritized according to an expected date of delivery, a level of delivery service, and/or a service level agreement associated with purchase orders assigned to the review queue. For instance, if the bottled spring water of the purchase order 222 is set for next day delivery, review of the purchase order 222 may be placed higher up on the review queue than reviews of purchase orders corresponding to ground delivery service. In some instances, the fraud detection module 130 may remove a purchase order from the review queue based at least in part on a newer risk score. For example, if the purchase order 222 is assigned to the review queue based at least in part on a level of certainty associated with a first risk score, the fraud detection module 130 may remove the purchase order 222 from the review queue based at least in part on a second risk score being below a predetermined fraud threshold and having a sufficient level of certainty.

In some other instances, the fraud detection module 130 may display the device activity 230 and/or the delivery information 232 to a human agent during a manual review of a purchase order. For example, when the review of the purchase order 222 reaches the front of the queue, a human agent may be presented with a graphical user interface that includes the device activity 230 and/or the delivery information 232, in addition to information from the item database 210, information from the fulfillment order information 212, and/or customer information 214 associated with the purchase order 222.

Figure 3:
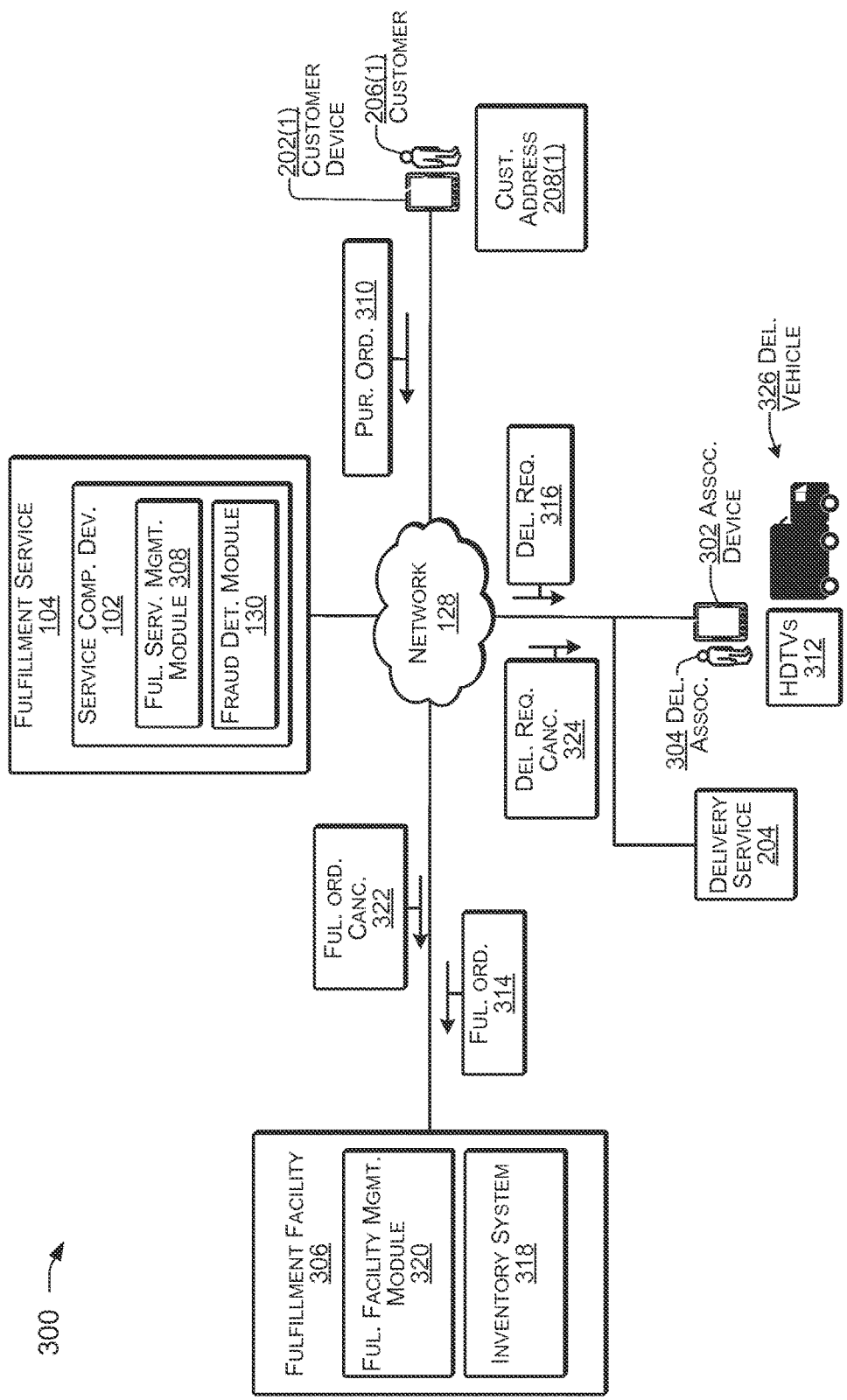
FIG. 3 illustrates yet another example environment for a fulfillment service that performs parallel fraud processing, according to some implementations.

FIG. 3 illustrates an example environment 300 for performing a parallel fraud detection process by a fulfillment service according to some implementations. FIG. 3 shows illustrative interactions between the service computing devices 102, the fulfillment service 104, the customer device 206(1), the delivery service 204, a delivery associate device 302 associated with a delivery associate 306, and a fulfillment facility 306, when performing various operations, including canceling a purchase order identified as a potentially fraudulent transaction.

As illustrated in FIG. 3, the service computing devices 104 may include a fulfillment service management module 308 and the fraud detection module 130. The fulfillment service management module 308 may manage the fulfillment of purchase orders within the environment 300. For instance, the customer 206(1) may send, to the service computing device 102, a purchase order 310 for three high definition televisions 312. In response, the fulfillment service management module 308 may send a fulfillment order 314 to the fulfillment facilities 306 that includes instructions for packaging the three high definition televisions 312 for delivery to the customer address 208(1). In some instances, the fulfillment order 314 may include the purchase order 310. Further, the fulfillment service management module 308 may send a delivery request 316 to the delivery service 204 and/or the delivery associate device 302 requesting delivery of the three televisions 312 to the customer address 208(1).

As illustrated in FIG. 3, the fulfillment facilities 306 may include an inventory system 318 and a fulfillment facility management module 320. The fulfillment facility management module 320 may manage fulfillment of fulfillment orders for items stored in the inventory system 318. For instance, the fulfillment facility management module 320 may process the fulfillment order 314 that includes instructions requesting retrieval and packing of the three televisions 312. In some cases, the fulfillment facility management module 320 may issue one or more tasks to human operators and/or automated agents employed within the fulfillment facility 304 during the fulfillment process.

As described herein, the fraud detection module 130 may determine that a purchase order is a potentially fraudulent transaction. For instance, the fraud detection module 130 may determine that the purchase order 310 is a potentially fraudulent transaction based at least in part on device activity 230(1) (not shown in FIG. 3). In response, the fulfillment service management module 308 may terminate or suspend fulfillment of the purchase order 310. For example, the fulfillment service management module 308 may send a fulfillment order cancellation 322 to the fulfillment facility 306. Upon receipt of the fulfillment order cancellation 322, the fulfillment facility management module 320 may determine whether the three televisions 312 have departed the fulfillment facility 306. If the three televisions 312 have not departed the fulfillment facility 306, the fulfillment facility management module 320 may issue one or more tasks suspending previously issued tasks to prepare the three televisions 312 for delivery to the customer address 208(1). Further, the fulfillment facility management module 320 may issue one or more tasks instructing agents of the inventory system 318 to restock the three televisions 312 within the inventory system 318.

Further, the fulfillment service management module 308 may send a delivery request cancellation 324 to the delivery service 204 and/or the delivery associate device 302. Upon receipt of the delivery request cancellation 324, the delivery service 204 may determine the location of the televisions 312. If the delivery service 204 determines that the delivery associate 304 or another agent of the delivery service 204 possess the televisions 312, the delivery service 204 may instruct the delivery associate device 302 or the other agent of the delivery service 204 to forgo delivery of the televisions 312. In some examples, the fulfillment service management module 308 may send the delivery request cancellation 324 to the delivery associate device 302 up until the moment the televisions 312 are delivered to the customer address 208(1). Therefore, the fraud detection module 130 is provided an increased window for determining whether the purchase order 310 is a potentially fraudulent transaction while ensuring the fulfillment service 104 meets applicable requirements under service level agreements and/or delivery guarantees. Thus, the fulfillment service 104 may reduce financial loss due to fraud and avoid untimely delivery of ordered items. Alternatively, if the delivery service 204 determines that the delivery associate 304 has already delivered the televisions 312, the delivery service 204 may communicate information about the delivery (e.g., delivery address, name of a recipient of the televisions, etc) to the fulfillment service management module 308 for performance of a chargeback process.

In some examples, the delivery associate 304 may use a delivery vehicle 326 to transport the three televisions 312 to the customer address 208(1). Further, the delivery associate device may be embedded into the delivery vehicle 326. For example, the delivery associate device 302 may be a touch screen dashboard device installed in an automobile 326. Some examples of delivery vehicles 326 include cars, trucks, motorcycles, aircraft, watercraft, bicycles, unmanned aerial vehicles, or any other similar apparatus capable of conveyance that transports people and/or objects. Additionally, or alternatively, a delivery associate 304 may deliver items, such as the televisions 312, on foot.

Figure 4:
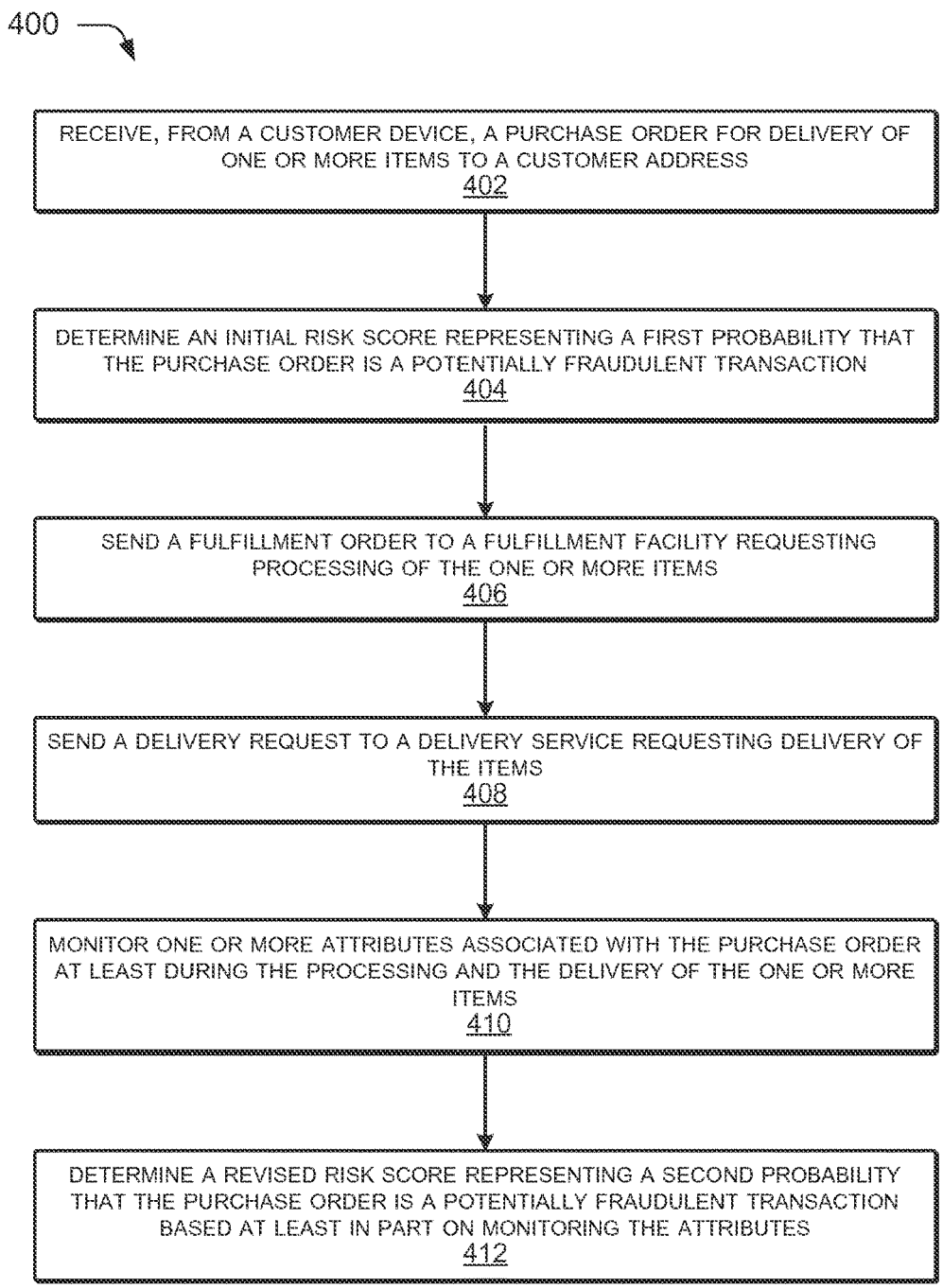
FIG. 4 illustrates a flow diagram of an example process for parallel fraud processing, according to some implementations.

FIG. 4 illustrates a flow diagram of an example process for parallel fraud detection process according to some implementations.

At 402, the one or more service computing devices may receive, from a customer device, a purchase order for delivery of one or more items to a customer address. For instance, as discussed above with respect to FIG. 2, the customer device 206(1) may send, to the service computing device 102, the purchase order 222 requesting delivery of bottled spring water. Further, the purchase order 222 may include order information 226. In some cases, the order information 226 may include the customer address 208(1) identifier representing a delivery destination for the bottled spring water. In addition, the order information 226 may specify the quantity of bottled spring water to deliver to the customer address 208(1). Further, the purchase order 222 may include a customer identifier 228 that identifies the customer 206(1) associated with the purchase order 222.

Additionally, the purchase order 222 may include payment information 224 that includes a financial account to charge when processing the purchase order 222. Further, the fulfillment service 104 may verify the payment information 224 before continuing with a fulfillment process. For instance, the purchase order 222 may include an identifier of a credit card account. Further, the service computing device 102 may validate the credit card account before performing subsequent steps of the parallel fraud detection process 400.

At 404, the one or more computing devices may determine an initial risk score representing a first probability that the purchase order is a potentially fraudulent transaction. For example, the fraud detection module 130 may determine a risk score representing the probability that the purchase order 222 is a potentially fraudulent transaction based at least in part on the decision model 218.

In some examples, the decision model 218 may determine the risk score based at least in part on information from the item database 210, the fulfillment order information 212, or the customer information 214. For example, the decision model 218 may determine the risk score based at least in part on information in the item database 210 that specifies previous transactions for bottled spring water. In another example, the decision model 218 may determine the risk score based at least in part on a price associated with the bottled spring water in the item database 210. Further, the decision model 218 may determine the risk score based upon information in the fulfillment order information 212 that specifies previous transactions identified as potentially fraudulent.

In addition, the decision model 218 may determine the risk score based at least in part on the customer account 216(1) associated with the customer 206(1). For instance, the decision model 218 may determine the risk score based at least in part on an email address associated with the customer account 216(1), a customer address associated with the customer account 216(1), previous transactions associated with the customer account 216(1), other accounts related to the customer account 216(1), one or more customer devices associated with the customer account 216(1), and/or recent account activity associated with the customer account 216(1).

Additionally, the decision model 218 may determine the risk score based at least in part on a financial account or billing address associated with the purchase order 222. For instance, the fraud detection module 130 may determine the risk score based at least in part on previous transaction history associated with the financial account and/or billing address. In another instance, the decision model 218 may determine the risk score based at least in part on a financial services provider associated with the financial account.

At 406, the one or more computing devices may send a fulfillment order to a fulfillment facility requesting processing of the one or more items. For example, the fulfillment service management module 308 may send the fulfillment order 314 to the fulfillment facility 306. In some instances, the fulfillment service management module 308 may send the fulfillment order 314 to the fulfillment facility 306 based at least in part on the fraud detection module 130 determining that the level of certainty associated with the risk score is insufficient. For instance, the fraud detection module 130 may determine that a certainty value of the risk score is below a predetermined certainty threshold. Further, the fraud detection module 130 may perform a parallel fraud detection process during a fulfillment process at the fulfillment facility 306 in order to acquire information that may be used to generate a risk score with a higher certainty value. Moreover, the fulfillment service management module 308 does not delay the fulfillment process while determining whether the purchase order 222 is a potentially fraudulent transaction with higher certainty.

In some other instances, the fulfillment service management module 308 may send the fulfillment order 314 to the fulfillment facility 306 based at least in part on a risk score being lower than a predetermined fraud threshold. Further, the fraud detection module 130 may perform a parallel fraud detection process during a fulfillment process at the fulfillment facility 306 in order to acquire information that may raise the risk score above the predetermined fraud threshold. Therefore, the fraud detection module 130 is provided a larger window to detect a potentially fraudulent transaction.

Additionally, the fraud detection module 130 may generate a task for manual review of the purchase order 222 for bottled spring water. Further, the fraud detection module 130 may place the task on a queue of review tasks. In some examples, the queue of review tasks may be prioritized. For instance, the queue for review tasks may be prioritized according to at least one of an expected date of delivery associated with the purchase order or a level of delivery service associated with the purchase order 222.

At 408, the one or more computing devices may send a delivery request to a delivery service requesting delivery of the items. For example, the fulfillment service management module 308 may send the delivery request 316 to the delivery service 204. In some instances, the fulfillment service management module 308 may send the delivery request 316 to the delivery service 204 based at least in part on the fraud detection module 130 determining that a level of certainty associated with the risk score is insufficient. Further, the fraud detection module 130 may perform a parallel fraud detection process during a delivery process performed by the delivery associate 304 associated with the delivery service 204, in order to acquire information that may be used to generate a risk score with a higher level of certainty. Moreover, the fulfillment service management module 308 does not delay the fulfillment process while determining whether the purchase order 222 is a potentially fraudulent transaction with a higher level of certainty.

In some other instances, the fulfillment service management module 308 may send the delivery request 316 to the delivery service 204 based at least in part on a risk score associated with the purchase order 222 being lower than a predetermined fraud threshold. Further, the fraud detection module 130 may perform a parallel fraud detection process during a delivery process performed by the delivery service 204 in order to acquire information that may raise the risk score above the predetermined fraud threshold. Therefore, the fraud detection module 130 is provided a larger window to detect a potentially fraudulent transaction.

At 410, the one or more computing devices may monitor one or more attributes associated with the purchase order at least during the processing and the delivery of the one or more items, wherein the attributes include at least one of a device identifier, a customer account identifier, an item identifier, or payment information. For instance, as discussed above with respect to FIG. 1, the service computing device 102 may receive the second purchase order 136. In another instance, as discussed above with respect to FIG. 2, the service computing device 102 may receive the device activity 230.

In some examples, the device activity 230 may include clickstream activity, browsing activity, or transaction activity. For instance, the device activity 230 may include modification to a customer address 208(1) associated with the purchase order 222. In some other instances, the device activity 230 may include modification to a level of delivery service associated with the purchase order 222. In some other examples, the device activity 230 may include account activity corresponding to one or more customer accounts 216 associated with the customer device 206(1). For instance, the device activity 230 may include updating an email address associated with the customer account 208(1), changing a password associated with the customer account 208(1), or updating payment information associated with the customer account 208(1). In some examples, the device activity 230 may correspond to device attributes associated with the customer devices 230. For instance, the device activity 230 may include information corresponding to logging into the shopping portal 118, via the customer device 202(1), from a particular a geo-location and/or with a particular IP Address.

At 412, the one or more computing devices may determine a revised risk score representing a second probability that the purchase order is a potentially fraudulent transaction based at least in part on monitoring the attributes. For instance, the fraud detection module 130 may determine the revised risk score based at least in part on the second purchase order 136 or the device activity 230.

For example, the decision model 218 may determine the second risk score based at least in part on information associated with clickstream activity, browsing activity, or transaction activity monitored after computation of the first risk score. Further, in some cases, the clickstream activity, browsing activity, or transaction activity may correspond to the customer device 202(1) and/or the customer account 216(1). Additionally, or alternatively, the clickstream activity, browsing activity, or transaction activity may correspond to the other customer devices 202(2)-202(N) and/or the other customer accounts 216(N). For instance, the decision model 218 may determine the second risk score based at least in part on comparing clickstream activity of the customer device 202(1) to clickstream activity corresponding to other customer devices 202(2)-202(N). Further, the clickstream activity of the other customer devices 202(2)-202(N) may correspond to transactions previously identified as fraudulent. In another instance, the decision model 218 may determine the second risk score based at least in part on comparing the clickstream activity to transaction history of the customer account. For example, if one or more items viewed on the online shopping portal 118 are not similar to a plurality of items previously purchased by the customer account 216(1), the decision model 218 may determine that the second risk score is above a predetermined fraud threshold.

In another example, the decision model 218 may determine the risk score based at least in part account activity corresponding to one or more customer accounts 216 associated with the customer device 206(1). For instance, the decision model 218 may determine the risk score based at least in part on a modification to an email address associated with the customer account 216(1), or a modification to a customer address associated with the customer account 216(1).

Additionally, as discussed above with respect to FIGS. 1 and 3, if the fraud detection module 130 determines that a purchase order is a potentially fraudulent transaction, the service computing devices 102 may send the fraud notification 138 to a delivery associate device or the delivery request cancellation 324 to the delivery service 204. Additionally, if the fraud detection module 130 determines that a purchase order is a potentially fraudulent transaction, the service computing devices 102 may send the fulfillment order cancellation 322 to the fulfillment facility 306.

FIGS. 5A and 5B illustrate a flow diagram of an example process for parallel fraud detection process according to some implementations.

At 502, the one or more service computing devices may receive, from a first customer device, a first purchase order for an item. The first purchase order includes, in some embodiments, a customer identifier that identifies a customer purchasing the item, an item identifier that identifies the item, a customer address identifier that identifies a delivery destination of the item, a device identifier that identifies the first customer device, and payment information. For instance, as discussed above with respect to FIG. 1, the customer device 110 may send, to the service computing device 102, the purchase order 120 requesting delivery of the items 114. Further, the purchase order 110 may include order information 124. In some cases, the order information 124 may include the customer address 116 identifier representing a delivery destination for the items 114. In addition, the order information 114 may specify the quantity of the items 114 to deliver to the customer address 116. Further, the purchase order 120 may include account information 126 that identifies the customer 112 associated with the purchase order 120.

Additionally, the purchase order 120 may include payment information 126 that includes a financial account to charge when processing the purchase order 120. Further, the fulfillment service 104 may verify the payment information 120 before continuing to process the purchase order 120. For instance, the purchase order 120 may include an identifier of a credit card account. Further, the service computing device 102 may validate the credit card account before performing subsequent steps of the parallel fraud detection process 500.

At 504, the one or more computing devices may determine an initial risk score representing a first probability that the first purchase order is a potentially fraudulent transaction. The initial risk score is based at least in part on one or more of customer account information, item information, the delivery destination, and the payment information. For example, the fraud detection module 130 may determine an initial risk score representing the probability that the purchase order 120 is a potentially fraudulent transaction. Further, as described herein, the fraud detection module 130 may utilize the decision model 218 to determine the initial risk score.

At 506, the one or more computing devices may send the first purchase order to a fulfillment facility requesting preparation of the item for delivery based at least in part on the initial risk score being below a predetermined threshold. For example, the fulfillment service management module 308 may send the fulfillment order 314 to the fulfillment facility 306.

In some instances, the fulfillment service management module 308 may send the fulfillment order 314 to the fulfillment facility 306 based at least in part on the initial risk score being lower than a predetermined fraud threshold. Further, the fraud detection module 130 may perform a parallel fraud detection process during a fulfillment process at the fulfillment facility 306 in order to acquire information that may be used to generate a revised risk score above the predetermined fraud threshold. Therefore, the fraud detection module 130 is provided an increased time window to determine that a purchase order is a potentially fraudulent transaction.

In some other instances, the fulfillment service management module 308 may send the fulfillment order 314 to the fulfillment facility 306 based at least in part on a level of certainty associated with the initial risk score. Further, the fraud detection module 130 may perform a parallel fraud detection process during a fulfillment process at the fulfillment facility 306 in order to acquire information that may be used to generate a revised risk score with a higher level of certainty. Moreover, the fulfillment service management module 308 does not delay the fulfillment process while the fraud detection module 130 determines the revised risk score with higher level of certainty. For example, the fulfillment service management module 308 may send the fulfillment order 314 to the fulfillment facility 306 before a require deadline of a service level agreement associated with the purchase order 120, instead of delaying the sending of the fulfillment order 314 until the fraud detection module 130 determines whether the purchase order is potentially fraudulent with a higher level of certainty.

At 508, the one or more computing devices may send a delivery request to a delivery service requesting delivery of the item to the customer address based at least in part on the initial risk score being below the predetermined threshold. The delivery request includes the item identifier and the customer address identifier. For example, the service computing devices 102 may send the delivery request 132 to the delivery associate device 106. As another example, the fulfillment service management module 308 may send the delivery request 316 to the delivery service 204.

In some instances, the service computing devices 102 may send the delivery request 132 to the delivery associate device 106 based at least in part on the initial risk score associated with the purchase order 120 being lower than a predetermined fraud threshold. Further, the fraud detection module 130 may perform a parallel fraud detection process during a delivery process performed by the delivery associate 108 in order to acquire information that may be used to generate a revised risk score above the predetermined fraud threshold. Therefore, the fraud detection module 130 is provided an increased time window to detect a potentially fraudulent transaction.

In some other instances, the fulfillment service management module 308 may send the delivery request 316 to the delivery service 204 based at least in part on a level of certainty associated with the initial risk score. Further, the fraud detection module 130 may perform a parallel fraud detection process during a delivery process performed by the delivery service 204 and/or the delivery associate 304, in order to acquire information that may be used to generate a revised risk score with a higher level of certainty. Moreover, the fulfillment service management module 308 does not delay the delivery process while the fraud detection module 130 determines the revised risk score with a higher level of certainty. For example, the fulfillment service management module 308 may send the delivery request 316 to the fulfillment facility 306 before a deadline of a service level agreement associated with the purchase order 310, instead of delaying the sending of the delivery request 316 until the fraud detection module 130 determines whether the purchase order 310 is a potentially fraudulent with a higher level of certainty.

At 510, the one or more computing devices may receive a second purchase order after sending the first purchase order to the fulfillment facility or after sending the delivery request to the delivery service. For example, as discussed above with respect to FIG. 1, the service computing device 102 may receive the second purchase order 136.

At 512, the one or more computing devices may associate the second purchase order with the first purchase order in response to determining that the second purchase order and the first purchase order share at least one of the item identifier, the customer identifier, the device identifier, or the customer address identifier. For example, the fraud detection module may determine that the second purchase order is associated with the first purchase order due to common payment information 122, order information (e.g., customer address 116 as the delivery address), account information, and/or other attributes of the purchase orders being similar or the same.

At 514, the one or more computing devices may determine a revised risk score for the first purchase order based at least in part on the second purchase order, the revised risk score being above the predetermined threshold. For instance, the fraud detection module 130 may determine a revised risk score based at least in part on the second purchase order 136. Further, as described herein, the fraud detection module 130 may utilize the decision model 218 to determine the revised risk score.

In some other examples, the fraud detection module 130 may determine that the first purchase order 120 is a potentially fraudulent transaction based at least in part on the cost of the second purchase order 136. For example, a cost of the second purchase order 136 may be substantially larger than previous purchase orders associated with the customer 112. In another example, a cost of the second purchase order 136 may be substantially similar to transactions previously identified as fraudulent.

In some other examples, the fraud detection module 130 may determine that the first purchase order 120 is a potentially fraudulent transaction based at least in part on a quantity and/or a type of one or more items associated with the second purchase order 136. For example, if the item 114 is typically ordered at low quantities, the second purchase order 136 may indicate that the first purchase order 120 is a potentially fraudulent transaction if the second purchase order 136 also includes an order for the item 114.

In yet some other examples, the payment information 138 included in the second purchase order may indicate that the first purchase order 120 is a potentially fraudulent transaction. For example, the payment information 138 may be associated with other potentially fraudulent activity at the fulfillment service 104.

At 512, the one or more computing devices may send a cancellation request to the delivery service to cancel delivery of the item based at least in part on the revised risk score being above the predetermined threshold. For example, as discussed above with respect to FIG. 1, if the fraud detection module 130 determines that a purchase order is a potentially fraudulent transaction, the service computing devices 102 may send the fraud notification 138 to a delivery associate device. As another example, as discussed above with respect to FIG. 3, if the fraud detection module 130 determines that a purchase order is a potentially fraudulent transaction, the service computing devices 102 may send delivery request cancellation to the delivery request cancellation 324 to the delivery service 204 and/or the delivery associate device 302, and/or the fulfillment order cancellation 322 to the fulfillment facility 306.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
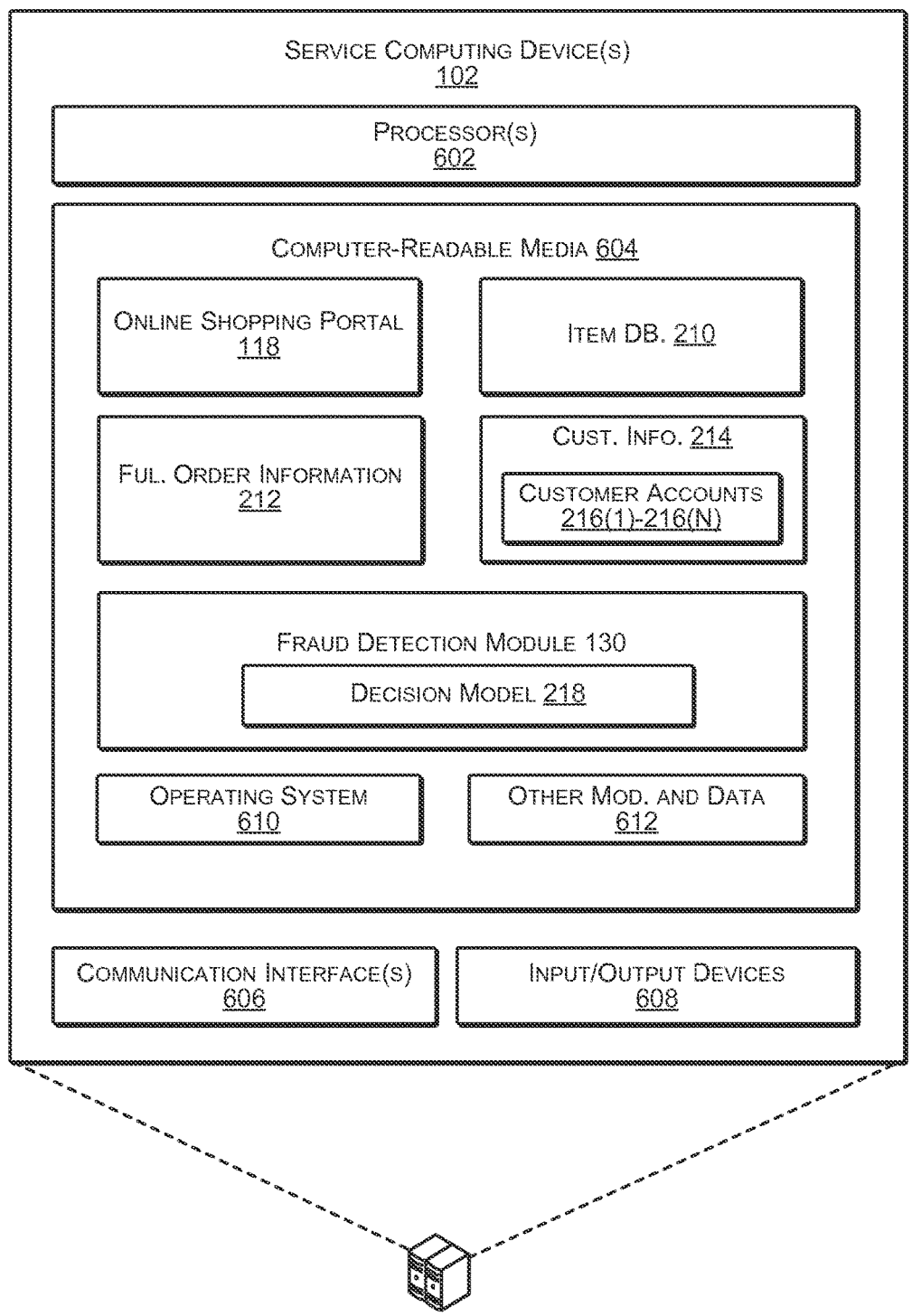
FIG. 6 illustrates a block diagram of an example fulfillment service computing device, according to some implementations.

FIG. 6 illustrates select components of the service computing device 102 that may be used to implement some functionality of the fulfillment service 104 described herein. The service computing device 102 may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing devices 102 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 102 may be located together or separately, and organized, for example, as virtual servers, server banks and/or server farms. The described functionality may be provided by the servers of a single entity or enterprise, or may be provided by the servers and/or services of multiple different entities or enterprises.

In the illustrated example, each service computing device 102 may include one or more processors 602, one or more computer-readable media 604, and one or more communication interfaces 606. Each processor 602 may be a single processing unit or a number of processing units, and may include single or multiple computing units or multiple processing cores. The processor(s) 602 can be implemented as one or more microprocessors, microcomputers, microcontrollers, digital signal processors, central processing units, state machines, logic circuitries, and/or any devices that manipulate signals based on operational instructions. For instance, the processor(s) 602 may be one or more hardware processors and/or logic circuits of any suitable type specifically programmed or configured to execute the algorithms and processes described herein. The processor(s) 602 can be configured to fetch and execute computer-readable instructions stored in the computer-readable media 604, which can program the processor(s) 602 to perform the functions described herein.

The computer-readable media 604 may include volatile and nonvolatile memory and/or removable and non-removable media implemented in any type of technology for storage of information, such as computer-readable instructions, data structures, program modules, or other data. Such computer-readable media 604 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 102, the computer-readable media 604 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 604 may be used to store any number of functional components that are executable by the processors 602. In many implementations, these functional components comprise instructions or programs that are executable by the processors 602 and that, when executed, specifically configure the one or more processors 602 to perform the actions attributed above to the service computing device 102. In addition, the computer-readable media 604 may store data used for performing the operations described herein.

In the illustrated example, the functional components stored in the computer-readable media 604 may include the online shopping portal 118, and the fraud detection module 130, including the decision model 218. Further, the computer-readable media 604 may store the item database 210, fulfillment order information 212, and customer information 214, including the customer accounts 216.

Additional functional components stored in the computer-readable media 604 may include an operating system 610 for controlling and managing various functions of the service computing device 102. The service computing device 102 may also include or maintain other functional components and data, such as other modules and data 612, which may include programs, drivers, etc., and the data used or generated by the functional components. Further, the service computing device 102 may include many other logical, programmatic, and physical components, of which those described above are merely examples that are related to the discussion herein.

The communication interface(s) 606 may include one or more interfaces and hardware components for enabling communication with various other devices, such as the customer device 110, customer device(s) 202, the delivery associate device 106, the delivery service 204, the delivery associate device 302, or other computing devices, over the network(s) 128. For example, communication interface(s) 606 may facilitate communication through one or more of the Internet, cable networks, cellular networks, wireless networks (e.g., Wi-Fi, cellular) and wired networks. As several examples, the service computing device 102 and the customer device 204 may communicate and interact with one another using any combination of suitable communication and networking protocols, such as Internet protocol (IP), transmission control protocol (TCP), hypertext transfer protocol (HTTP), cellular or radio communication protocols, and so forth.

The service computing device 102 may further be equipped with various input/output (I/O) devices 608. Such I/O devices 608 may include a display, various user interface controls (e.g., buttons, joystick, keyboard, mouse, touch screen, etc.), audio speakers, connection ports and so forth.

What is claimed is:

1. A method comprising:
   receiving, from a customer device, a purchase order to deliver an item to a customer address;
   determining an initial risk score representing a first probability that the purchase order is a potentially fraudulent transaction;
   sending a fulfillment order to a fulfillment facility requesting processing of the item;
   sending a delivery request to a delivery service requesting delivery of the item;
   monitoring one or more attributes associated with the purchase order at least during the processing and the delivery of the item, wherein the one or more attributes include at least one of a device identifier, a customer account identifier, a delivery address identifier, an item identifier, or payment information;
   determining a revised risk score representing a second probability that the purchase order is a potentially fraudulent transaction based at least in part on monitoring the one or more attributes;
   canceling fulfillment of the purchase order based at least in part on the revised risk score being at or above a predetermined fraud threshold; and
   receiving a second purchase order from a second customer device, wherein the second purchase order includes information associated with the one or more attributes,
      wherein the revised risk score is at or above the predetermined fraud threshold based in part on at least one of:
      a second item included in the second purchase order;
      a combined cost of the purchase order and the second purchase order;
      a combined quantity of items of purchase order and the second purchase order;
      identifying a potentially fraudulent transaction associated with a second customer address associated with the second purchase order; or
      payment information associated with the second purchase order.

2. The method of claim 1, wherein canceling fulfillment of the purchase order based at least in part on the revised risk score being at or above the predetermined fraud threshold, further comprises at least one of:
   sending a fulfillment order cancellation to the fulfillment facility; or
   sending a delivery request cancellation to a delivery associate device associated with a delivery associate in possession of the item.

3. The method of claim 1, wherein a level of certainty is based at least in part on one of a quantity of decision factors used to determine the initial risk score or a quality of the decision factors used to determine the initial risk score.

4. The method of claim 1, wherein the level of certainty represents a first level of certainty, and further comprising:
   determining a second level of certainty associated with the revised risk score; and
   removing the purchase order from a queue based at least in part on the second level of certainty.

5. The method of claim 1, further comprising:
   determining that a customer has updated the customer address associated with the purchase order; and
   wherein the revised risk score is at or above the predetermined fraud threshold based in part on the customer updating the customer address.

6. The method of claim 5, wherein determining that the customer has updated the customer address associated with the purchase order is based at least in part on receiving delivery information from the delivery service.

7. The method of claim 1, further comprising:
   determining one or more customer accounts related to the purchase order;
   determining a recent update to a password or email address associated with the one or more customer accounts; and
   wherein the revised risk score is at or above the predetermined fraud threshold based in part on the recent update.

8. The method of claim 1, wherein the one or more attributes include at least one a geo-location of the customer device, an Internet Protocol address of the customer device, or an application installed on the customer device.

9. The method of claim 1, wherein monitoring the one or more attributes includes determining customer web browsing activity at an electronic commerce website; and further comprising comparing the customer web browsing activity to at least one of:

browsing activity associated with a plurality of purchase orders identified as potentially fraudulent, or browsing activity associated with one or more customer accounts related to the purchase order.

10. One or more non-transitory computer-readable media maintaining instructions that, when executed by one or more processors, program the one or more processors to:

receive, from a customer device, a purchase order for delivery of an item, wherein the purchase order is associated with a customer account;

determine an initial probability that the purchase order is a potentially fraudulent transaction based at least in part on a prediction model;

place the purchase order in a queue for manual review by a human agent based at least in part on a level of certainty associated with the initial probability that the purchase order is a potentially fraudulent transaction, wherein the queue is prioritized based at least in part on a level of delivery service associated with the purchase order or a service legal agreement associated with the purchase order;

send, based at least in part on the initial probability being at or below a predetermined threshold, a fulfillment order to a fulfillment facility requesting processing of the item prior to expiration of a time period corresponding to the service level agreement;

monitor, at least during the processing and the delivery of the item, activity associated with at least one of the customer account, the customer device, or the purchase order;

determine a revised probability that the purchase order is a potentially fraudulent transaction based at least in part on the activity; and canceling fulfillment of the purchase order based at least in part on the revised probability being above the predetermined threshold.

11. The one or more non-transitory computer-readable media as recited in claim 10, wherein the instructions further program the one or more processors to:

determine that a first level of certainty associated with the initial risk score is at or below a predetermined certainty threshold based at least in part on initial decision factors of the prediction model; and determine that a second level of certainty associated with the revised risk score is at or above the predetermined certainty threshold based at least in part on additional decision factors of the prediction model corresponding to the activity.

12. The one or more non-transitory computer-readable media as recited in claim 10, wherein the prediction model is a rule based decision tree system.

13. A system comprising:
one or more processors; and
one or more computer-readable media storing instructions executable by the one or more processors, wherein the instructions program the one or more processors to implement a service to:

receive, from a customer device, a first purchase order to deliver an item to a customer address;

determine an initial risk score representing a first probability that the first purchase order is a potentially fraudulent transaction;

send a fulfillment order to a fulfillment facility requesting processing of the item;

send a delivery request to a delivery service requesting delivery of the item;

monitor one or more attributes associated with the first purchase order at least during the processing and the delivery of the item, wherein the one or more attributes include at least one of a device identifier, a customer account identifier, a delivery address identifier, an item identifier, or payment information;

determine a revised risk score representing a second probability that the first purchase order is a potentially fraudulent transaction based at least in part on monitoring the one or more attributes;

send a cancellation request to cancel delivery of the item based at least in part on the revised risk score being at or above the predetermined threshold;

receive, from a customer device, a second purchase order to deliver the item to a customer address;

determine that the second purchase order is for the item based at least in part on the item identifier;

determine an actual order quantity for the item based at least in part on the first purchase order and the second purchase order;

determine an expected order quantity for the item based at least in part on a plurality of other purchase orders associated with the item; and determine a second revised risk score for the first purchase order that is further based at least in part on revised risk score and the actual order quantity exceeding the expected order quantity.

14. The system as recited in claim 13, wherein:
the first purchase order is associated with a service level agreement requiring at least one of:
the first purchase order to be sent to the fulfillment facility prior to expiration of a period of time, or
the delivery request to be sent to the delivery service prior to expiration of the period of time; and
the cancellation request is sent after expiration of the period of time.

15. The system as recited in claim 13, wherein canceling delivery of the first purchase order based at least in part on the revised risk score being at or above the predetermined threshold, further comprises at least one of:

sending a fulfillment order cancellation to the fulfillment facility; or sending a delivery request cancellation to a delivery associate device associated with the delivery service.

16. The method as recited claim 1, wherein determining the initial risk score is based at least in part on information associated with a transaction previously identified as fraudulent.

17. The one or more non-transitory computer-readable media as recited in claim 10, wherein the initial risk score is based at least in part on information associated with a transaction previously identified as fraudulent.

18. The system as recited in claim 13, wherein the initial risk score is based at least in part on information associated with a transaction previously identified as fraudulent.

19. The method as recited in claim 4, further comprising prioritizing the queue based on at least an expected date of delivery of the item.

20. The method as recited in claim 4, further comprising prioritizing the queue based on at least a level of delivery service associated with the order.

* * * * *